Figure 1:
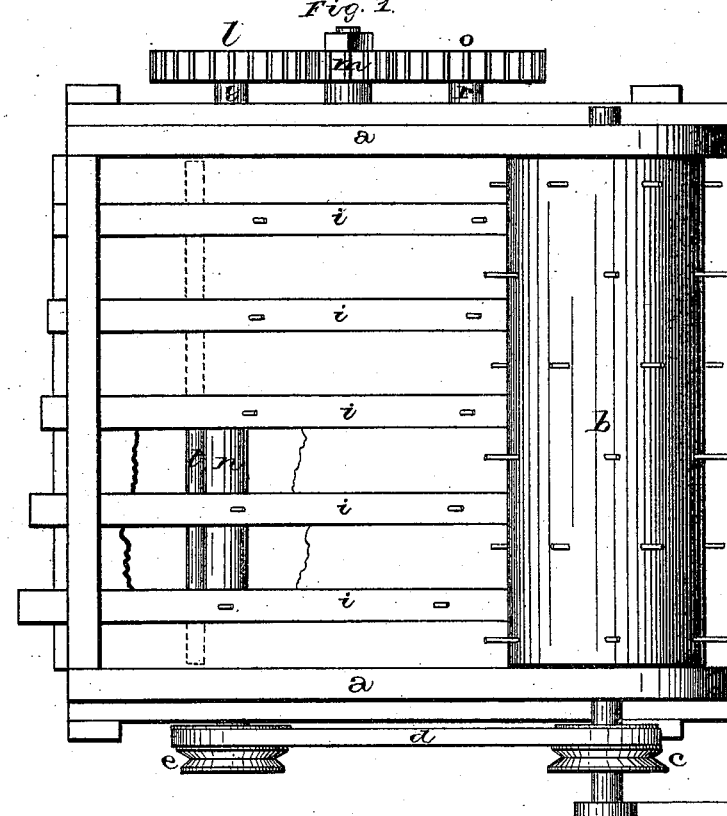
Figure 2:
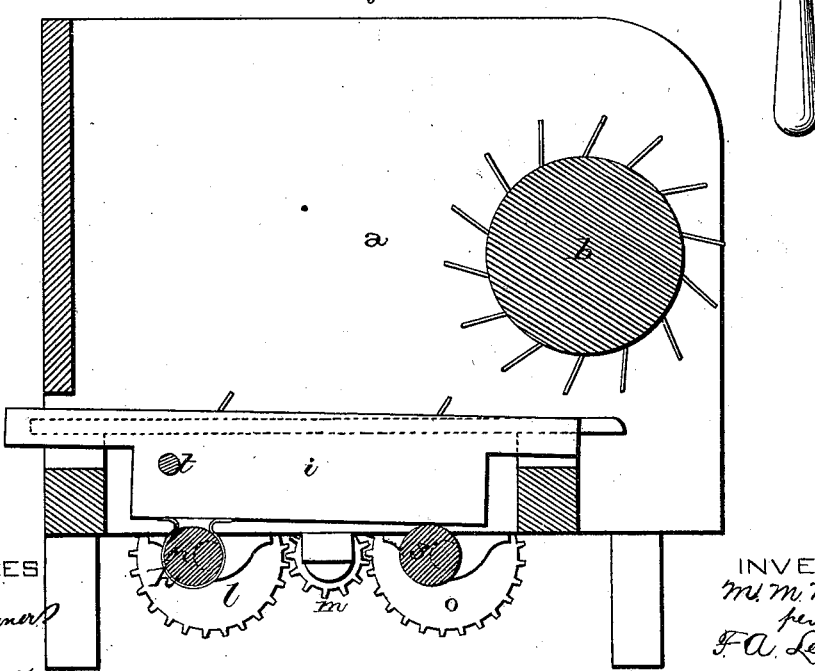

M. M. MASSEY.
FEEDING-ATTACHMENTS FOR COTTON-GINS.

No. 194,833. Patented Sept. 4, 1877.

WITNESSES

INVENTOR.
M. M. Massey,
per
F. A. Lehmann
Atty.

UNITED STATES PATENT OFFICE.

MILTON M. MASSEY, OF MACON, GEORGIA.

IMPROVEMENT IN FEEDING ATTACHMENTS FOR COTTON-GINS.

Specification forming part of Letters Patent No. 194,833, dated September 4, 1877; application filed August 15, 1877.

*To all whom it may concern:*

Be it known that I, M. M. MASSEY, of Macon, in the county of Bibb and State of Georgia, have invented certain new and useful Improvements in Feeding Attachments for Cotton-Gins; and I do hereby declare the following to be a full, clear, and exact description of the invention, such as will enable others skilled in the art to which it pertains to make and use it, reference being had to the accompanying drawings, which form part of this specification.

My invention relates to an improvement in feeding attachments for cotton-gins; and it consists in the arrangement and combination of parts that will be more fully described hereinafter, whereby cotton may be fed rapidly and evenly forward to the saws to be ginned without any watchfulness or care upon the part of the operator.

The accompanying drawings represent my invention.

$a$ represents a suitable frame, which is open at its top and front side alone. Journaled inside of this frame, at or near its front end, is the large cylinder $b$, which is provided with teeth for catching in the cotton and carrying it forward. Upon one of the outer ends of the shaft of this cylinder are placed a large pulley and a small pulley, $c$, over which passes the driving-belt $d$, which communicates motion through a double pulley, $e$, to the shaft $g$, that is journaled in the under side of the frame $a$. These two double pulleys are placed so that the smaller pulleys are just opposite the larger ones, so that the cylinder may be made to revolve more slowly and the shaft $g$ more rapidly, or just the reverse.

All that part of the shaft between the sides of the frame $a$ forms an eccentric, around which are passed the straps $h$, which connect the eccentric with the feeding-bars $i$. Upon the opposite end of the shaft $g$ from the pulleys $e$ is the gear-wheel $l$, which communicates motion to the idle-wheel or pinion $m$, which in turn communicates motion to the wheel $o$ on the end of the shaft $r$, the central part of this shaft being formed into an eccentric, $s$, in the same manner as the shaft $g$.

Every alternate one of the feeding-bars is provided with a strap, as already described, for passing around the eccentric $n$, and in order to connect the feeding-bars which have no straps with those that have, and make them all move uniformly together, a rod, $t$, is passed through them all from side to side, as shown.

The eccentric $s$ serves only as a support for the front end of the bars, so as to keep them parallel during the whole course of their movement as they rise, move forward, fall, and move backward again.

As the top of each bar has a number of spurs or projections extending above the top of its surface, when the machine is set in motion each bar rises and moves forward, carrying the cotton that is upon its top forward toward the feeding-cylinder, and then sinks down below the level of the floor, moves backward so as to gather a fresh quantity, and then feeds it forward again. In this manner all the cotton in the frame $a$ is fed forward rapidly and evenly.

As already described, should the feeding forward to the cylinder be too rapid, the belt can be changed upon the pulleys, so as to make the cylinder move more rapidly and the bars feed forward more slowly; or should the cylinder feed forward too rapidly the belt may be changed, so as to make the cylinder revolve more slowly and the bars feed forward more rapidly.

Having thus described my invention, what I claim, and desire to secure by Letters Patent, is—

1. The combination of the frame $a$, driving-pulleys $c\ e$, belt $d$, the two eccentrics, and the feeding-bars, all substantially as described.

2. The combination of the two eccentrics, geared together, straps $h$ upon each alternate bar, and a connecting-rod, $t$, whereby all the rods are made to move uniformly together, substantially as specified.

In testimony that I claim the foregoing I have hereunto set my hand this 4th day of August, 1877.

MILTON MADISON MASSEY.

Witnesses:
D. M. FLANDERS,
D. H. ADAMS.